US012725375B2

(12) United States Patent
Fernandez Orellana et al.

(10) Patent No.: US 12,725,375 B2
(45) Date of Patent: Sep. 1, 2026

(54) PHYSICAL AND VIRTUAL OBJECT ATTENTION TRACKING FOR A USER DEVICE COMPRISING MULTIPLE SENSORS

(71) Applicant: Dell Products L.P., Round Rock, TX (US)

(72) Inventors: Pedro Fernandez Orellana, Surfers Paradise (AU); Zijia Wang, London (GB); Ahmed Khalid, Carrigtwohill (IE)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 18/829,568

(22) Filed: Sep. 10, 2024

(65) Prior Publication Data

US 2026/0073642 A1 Mar. 12, 2026

(51) Int. Cl.
*G06T 19/00* (2011.01)
*G06F 3/01* (2006.01)
*G06F 3/14* (2006.01)
*G06V 20/20* (2022.01)

(52) U.S. Cl.
CPC ............ *G06T 19/006* (2013.01); *G06F 3/013* (2013.01); *G06F 3/14* (2013.01); *G06V 20/20* (2022.01); *G06V 2201/07* (2022.01)

(58) Field of Classification Search
None
See application file for complete search history.

(56) References Cited

U.S. PATENT DOCUMENTS 11,269,420 B1 * 3/2022 Marti .................. G06V 20/597
11,504,609 B2 * 11/2022 Mikhailov ............. G06F 3/013
2015/0049112 A1 * 2/2015 Liu ..................... G02B 27/017
345/633

(Continued)

OTHER PUBLICATIONS

W.X. Chen et al. "Gaze Gestures and Their Applications in Human-Computer Interaction", In: arXiv preprint arXiv:1910.07428, Oct. 16, 2019.

(Continued)

*Primary Examiner* — Martin Mushambo
(74) *Attorney, Agent, or Firm* — Ryan, Mason & Lewis, LLP

(57) ABSTRACT

An apparatus comprises at least one processing device that includes a processor coupled to a memory. The at least one processing device is configured to obtain first sensor information from at least one user-facing sensor of a user device, to obtain second sensor information from at least one environment-facing sensor of the user device, and to process the first sensor information and the second sensor information to identify an object of user attention, the object comprising one of a physical object in an environment outside of the user device and a virtual object presented on a display screen of the user device. In some embodiments, the user device comprises a laptop computer, with the user-facing sensor being arranged on a display screen side of a cover of the laptop computer and the environment-facing sensor being arranged on an opposite side of the cover relative to the display screen side.

20 Claims, 14 Drawing Sheets

(56) References Cited

U.S. PATENT DOCUMENTS

2015/0049113 A1* 2/2015 Rahman .............. G06F 16/9554 345/633
2015/0279113 A1* 10/2015 Knorr .............. G06T 7/11 345/633
2016/0132132 A1* 5/2016 Li .............. G06F 9/451 715/702
2016/0358181 A1* 12/2016 Bradski .............. H04L 63/0861
2017/0109936 A1* 4/2017 Powderly .............. G06F 3/0346
2017/0197142 A1* 7/2017 Stafford .............. G06F 3/014
2018/0004283 A1* 1/2018 Mathey-Owens .............. G06F 3/04842
2018/0182160 A1* 6/2018 Boulton .............. G02B 27/017
2020/0111148 A1* 4/2020 Soni .............. G06F 3/015
2021/0056306 A1* 2/2021 Hu .............. G06N 3/084
2021/0056750 A1* 2/2021 Rowley .............. G06T 17/00
2021/0286425 A1* 9/2021 Ghuge .............. G06F 3/013
2023/0156314 A1* 5/2023 Sztuk .............. G06F 3/013 348/222.1
2023/0161409 A1* 5/2023 Terrano .............. G06F 3/013 345/633
2023/0179868 A1* 6/2023 Nikhara .............. H04N 23/665 345/633
2024/0273835 A1* 8/2024 Gustafsson .............. G06F 3/017
2025/0225742 A1* 7/2025 Kang .............. G06T 19/006
2025/0264937 A1* 8/2025 Lau .............. G01S 19/14

OTHER PUBLICATIONS

Niilo V. Valtakari et al. "Eye tracking in human interaction: Possibilities and limitations", Behavior Research Methods, pp. 1592-1608, 53, Jan. 6, 2021.

Interaction Design Foundation, 3D User Interfaces (3D UI), https://www.interaction-design.org/literature/topics/3d-user-interfaces-3d-ui, Sep. 10, 2024.

* cited by examiner

PHYSICAL AND VIRTUAL OBJECT ATTENTION TRACKING FOR A USER DEVICE COMPRISING MULTIPLE SENSORS

BACKGROUND

Examples of user devices include laptop computers, desktop computers, tablet computers, smartphones, smartwatches, gaming systems, and numerous others. Such user devices may be equipped with various sensors of different types, such as one or more cameras or other types of image sensors. Nonetheless, a need exists for techniques that can provide additional functionality in these and other user devices.

SUMMARY

Illustrative embodiments of the present disclosure provide techniques for physical and virtual object attention tracking for a user device comprising multiple sensors. For example, in some embodiments, the multiple sensors include at least one user-facing sensor and at least one environment-facing sensor, where such sensors may comprise, for example, cameras or other types of image sensors. Additional or alternative types of sensors may be used in other embodiments. Images or other sensor information generated by the sensors are utilized in illustrative embodiments to provide accurate and efficient tracking of both physical objects in an environment outside of a display screen of the user device and virtual objects presented on the display screen of the user device.

In one embodiment, an apparatus comprises at least one processing device comprising a processor coupled to a memory. The at least one processing device is configured to obtain first sensor information from at least one user-facing sensor of a user device, to obtain second sensor information from at least one environment-facing sensor of the user device, and to process the first sensor information and the second sensor information to identify an object of user attention, the object comprising one of a physical object in an environment outside of the user device and a virtual object presented on a display screen of the user device.

The at least one processing device in some embodiments comprises the user device itself. Additionally or alternatively, the at least one processing device may comprise a cloud-based processing device configured to communicate with the user device over a network. Numerous other arrangements of one or more processing devices, each comprising at least one processor coupled to memory, may be used in illustrative embodiments.

In some embodiments, the user device comprises a laptop computer, with the user-facing sensor being arranged on a display screen side of a cover of the laptop computer and the environment-facing sensor being arranged on an opposite side of the cover relative to the display screen side. A wide variety of other types of user devices equipped with user-facing and environment-facing sensors can be used.

The user-facing sensor and the environment-facing sensor may comprise, for example, respective cameras or other types and arrangements of one or more imaging devices in any combination. Numerous other types of sensors may be used in conjunction with or in place of cameras or other imaging devices.

In some embodiments, processing the first sensor information and the second sensor information to identify an object of user attention illustratively comprises tracking a line of sight of the user based at least in part on the first sensor information, determining a location of the physical object in the environment outside of the user device based at least in part on the second sensor information, and determining whether the line of sight of the user intersects with the location of the physical object in the environment outside of the user device or a location of the virtual object presented on a display screen of the user device.

Additionally or alternatively, processing the first sensor information and the second sensor information to identify an object of user attention illustratively comprises determining a gaze vector of the user based at least in part on the first sensor information, and determining whether or not a user gaze characterized by the gaze vector falls within designated boundaries of the display screen of the user device.

Some embodiments further involve, responsive to the user gaze characterized by the gaze vector being within designated boundaries of the display screen of the user device, determining coordinates of the user gaze and identifying the virtual object presented on a display screen of the user device based at least in part on the determined coordinates.

Some embodiments further involve, responsive to the user gaze characterized by the gaze vector not being within designated boundaries of the display screen of the user device, computing current locations of respective ones of a plurality of physical elements in the environment outside the user device, detecting intersection of the gaze vector with at least one of the physical elements, and identifying the physical object in the environment outside of the user device based at least in part on the detected intersection.

In some embodiments, the at least one processing device is further configured to initiate performance of at least one automated action based at least in part on the identifying of the object of user attention. Such automated actions may include, for example, automatically presenting information on the display screen of the user device relating to an identified object in the environment outside of the user device, and/or automatically establishing a network connection with an additional device corresponding to an identified object in the environment outside of the user device. Other automated actions can include, for example, providing additional information obtained as a result of the identifying of the object of user attention to one or more artificial intelligence (AI) models deployed on the user device and/or on a related device, such as a cloud-based processing device.

These and other illustrative embodiments disclosed herein include, without limitation, methods, apparatus, systems and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
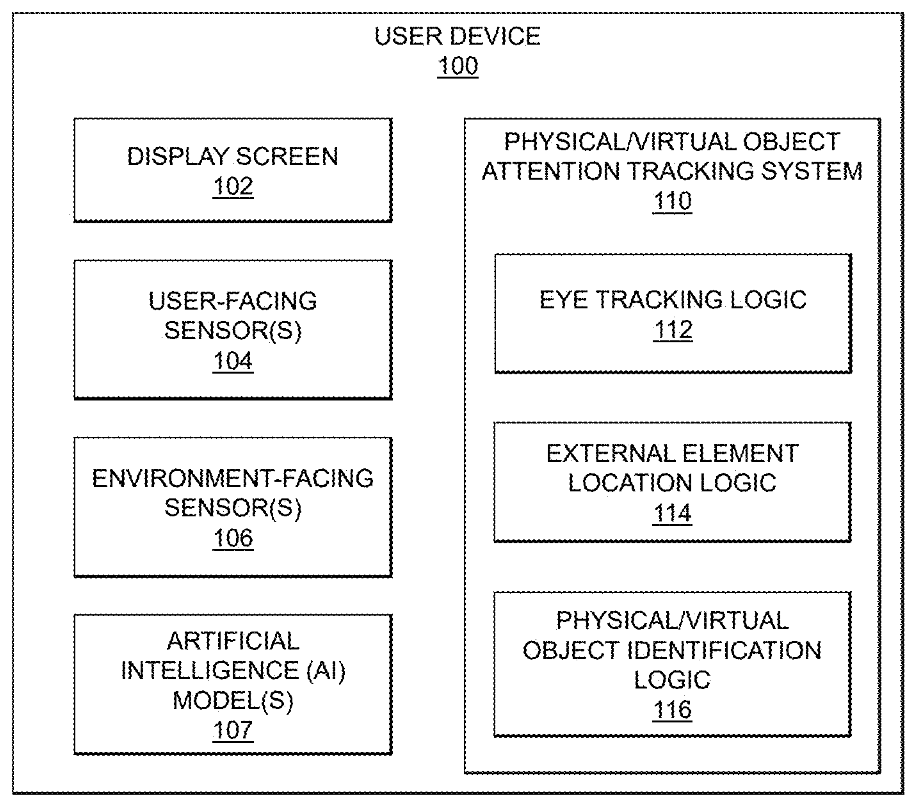
FIG. 1 is a block diagram of an example user device configured for physical and virtual object attention tracking in an illustrative embodiment.

FIG. 1 shows a user device 100 with physical and virtual object attention tracking in an illustrative embodiment. The user device 100, which may be, for example, a laptop computer, a desktop computer, a tablet computer, a smartphone, a smartwatch, a gaming system or another type of user device, includes a display screen 102, one or more user-facing sensors 104, one or more environment-facing sensors 106, one or more AI models 107, and a physical/virtual object attention tracking system 110. The user device 100 is an example of what is more generally referred to herein as at least one processing device, with each such processing device comprising at least one processor and associated memory.

The one or more AI models 107 may comprise, for example, large language models (LLMs) such as generative pre-trained transformer (GPT) models. More particular examples of these models include ChatGPT and Llama. In other embodiments, the user device 100 may be additionally or alternatively configured to interact with one or more AI models deployed on an external server or other external processing device, such as a cloud-based server or other cloud-based processing device. In some embodiments, information obtained in the user device as a result of identifying an object of user attention in the physical/virtual object attention tracking system 110 is provided to the one or more AI models 107 for further processing. For example, such further processing can include initiation of various automated actions in the user device 100 in order to enhance the user experience.

The physical/virtual object attention tracking system 110 illustratively comprises eye tracking logic 112, external element location logic 114, and physical/virtual object identification logic 116. Such logic components are illustratively implemented at least in part in the form of software that executes on at least one processing device utilizing at least one processor and at least one memory thereof, to collectively perform example physical and virtual object attention tracking algorithms as disclosed herein. Accordingly, one or more of the logic components 112, 114 and 116 may be implemented at least in part in the form of software that is stored in memory and executed by a processor. Moreover, the configuration and arrangement of these and other logic components referred to herein can be varied in other embodiments. For example, the disclosed functionality can be separated into different arrangements of more or fewer logic components in other embodiments.

In operation, the physical/virtual object attention tracking system 110 is configured to obtain first sensor information from the one or more user-facing sensors 104, to obtain second sensor information from the one or more environment-facing sensors 106, and to process the first sensor information and the second sensor information to identify an object of user attention, where the object of user attention illustratively comprises one of a physical object in an environment outside of the user device 100 and a virtual object presented on the display screen 102 of the user device 100. Such operations are illustratively performed by the collective operation of the logic components 112, 114 and 116.

The one or more user-facing sensors 104 and the one or more environment-facing sensors 106 may comprise, for example, respective cameras or other types and arrangements of one or more imaging devices in any combination. Such imaging devices generate one or more images, which in some embodiments may comprise frames of a video signal. Accordingly, a given image generated by an imaging device can comprise at least a portion of a video signal. Numerous other types of sensors may be used in conjunction with or in place of cameras or other imaging devices. Also, the term "sensor" is intended to be broadly construed, and may encompass, for example, a still image camera and/or a video camera, an infrared camera, a depth sensor, or other similar device, or combinations of multiple such devices.

A given one of the one or more user-facing sensors 104 is generally configured to have a field of view that includes at least a portion of a user of the user device 100, such as a user that is viewing the display screen 102 of the user device 100.

The first sensor information obtained from the one or more user-facing sensors 104 can comprise, for example, images or other information obtained directly from the sensor or obtained indirectly from one or more components that interface with the sensor. Additionally or alternatively, such sensor information can include information that is generated at least in part by processing one or more outputs provided by the sensor. The term "sensor information" as used herein is therefore intended to be broadly construed.

A given one of the one or more environment-facing sensors 106 is generally configured to have a field of view that includes at least a portion of an environment external to the user device 100. For example, multiple environment-facing sensors 106 may be used, each with a different field of view capturing a different portion of an external environment of the user device 100. Such fields of view of the environment-facing sensors 106 in some embodiments are directed away from the user and therefore do not include, for example, a significant portion of a user that is viewing the display screen 102 of the user device 100.

The second sensor information obtained from the one or more environment-facing sensors 106 can comprise, for example, images or other information obtained directly from the sensor or obtained indirectly from one or more components that interface with the sensor. Additionally or alternatively, such sensor information can include information that is generated at least in part by processing one or more outputs provided by the sensor.

The FIG. 1 embodiment is an example of an arrangement in which at least one processing device configured to provide the physical and virtual object attention tracking functionality comprises the user device itself. It is also possible for the at least one processing device configured to provide the physical and virtual object attention tracking functionality to be arranged at least in part external to the user device, as in an arrangement in which such functionality is performed by cloud-based processing device configured to communicate with the user device over a network. An example of such an arrangement will be described below in conjunction with FIG. 2. Numerous other arrangements of one or more processing devices, each comprising at least one processor coupled to memory, may be used in illustrative embodiments.

In some embodiments, the user device 100 comprises a laptop computer, with at least one of the one or more user-facing sensors 104 being arranged on a display screen side of a cover of the laptop computer and at least one of the one or more environment-facing sensors 106 being arranged on an opposite side of the cover relative to the display screen side. Examples of such arrangements will be described in more detail below in conjunction with FIGS. 4 through 12. A wide variety of other types of user devices equipped with user-facing and environment-facing sensors can be used.

In some embodiments, processing the first sensor information and the second sensor information to identify an object of user attention illustratively comprises tracking a line of sight of the user based at least in part on the first sensor information in the eye tracking logic 112, determining a location of the physical object in the environment outside of the user device 100 based at least in part on the second sensor information in the external element location logic 114, and determining whether the line of sight of the user intersects with the location of the physical object in the environment outside of the user device 100 or a location of the virtual object presented on the display screen 102 of the user device 100 in the physical/virtual object identification logic 116.

Additionally or alternatively, processing the first sensor information and the second sensor information to identify an object of user attention illustratively comprises determining a gaze vector of the user based at least in part on the first sensor information, illustratively in the eye tracking logic 112, and determining whether or not a user gaze characterized by the gaze vector falls within designated boundaries of the display screen 102 of the user device 100, illustratively in the physical/virtual object identification logic 116.

Some embodiments further involve, responsive to the user gaze characterized by the gaze vector being within designated boundaries of the display screen 102 of the user device 100, determining coordinates of the user gaze and identifying the virtual object presented on the display screen 102 of the user device 100 based at least in part on the determined coordinates.

Some embodiments further involve, responsive to the user gaze characterized by the gaze vector not being within designated boundaries of the display screen 102 of the user device 100, computing current locations of respective ones of a plurality of physical elements in the environment outside the user device 100, detecting intersection of the gaze vector with at least one of the physical elements, and identifying the physical object in the environment outside of the user device 100 based at least in part on the detected intersection.

In some embodiments, the at least one processing device is further configured to initiate performance of at least one automated action based at least in part on the identifying of the object of user attention. Such automated actions may include, for example, automatically presenting information on the display screen 102 of the user device 100 relating to an identified object in the environment outside of the user device 100, and/or automatically establishing a network connection with an additional device corresponding to an identified object in the environment outside of the user device 100.

Other automated actions can include, for example, providing additional information obtained as a result of the identifying of the object of user attention to at least one of the one or more AI models 107 deployed on the user device. In other embodiments, such information may additionally or alternatively be provided to one or more AI models deployed on a related device, such as a cloud-based processing device. Automated actions in some embodiments may be triggered based at least in part on outputs of the one or more AI models 107.

It should be noted that the term "object" as used herein is intended to be broadly construed, so as to encompass, in the case of a physical object, humans, animals, inanimate objects or other types of real-world objects, as well as portions or combinations thereof, and in the case of a virtual object, any type of object that may be presented to a user in a visually-perceptible manner on a display screen of a user device.

Also, the term "user" herein is intended to be broadly construed so as to encompass numerous arrangements of human, hardware, software or firmware entities, as well as combinations of such entities.

Figure 2:
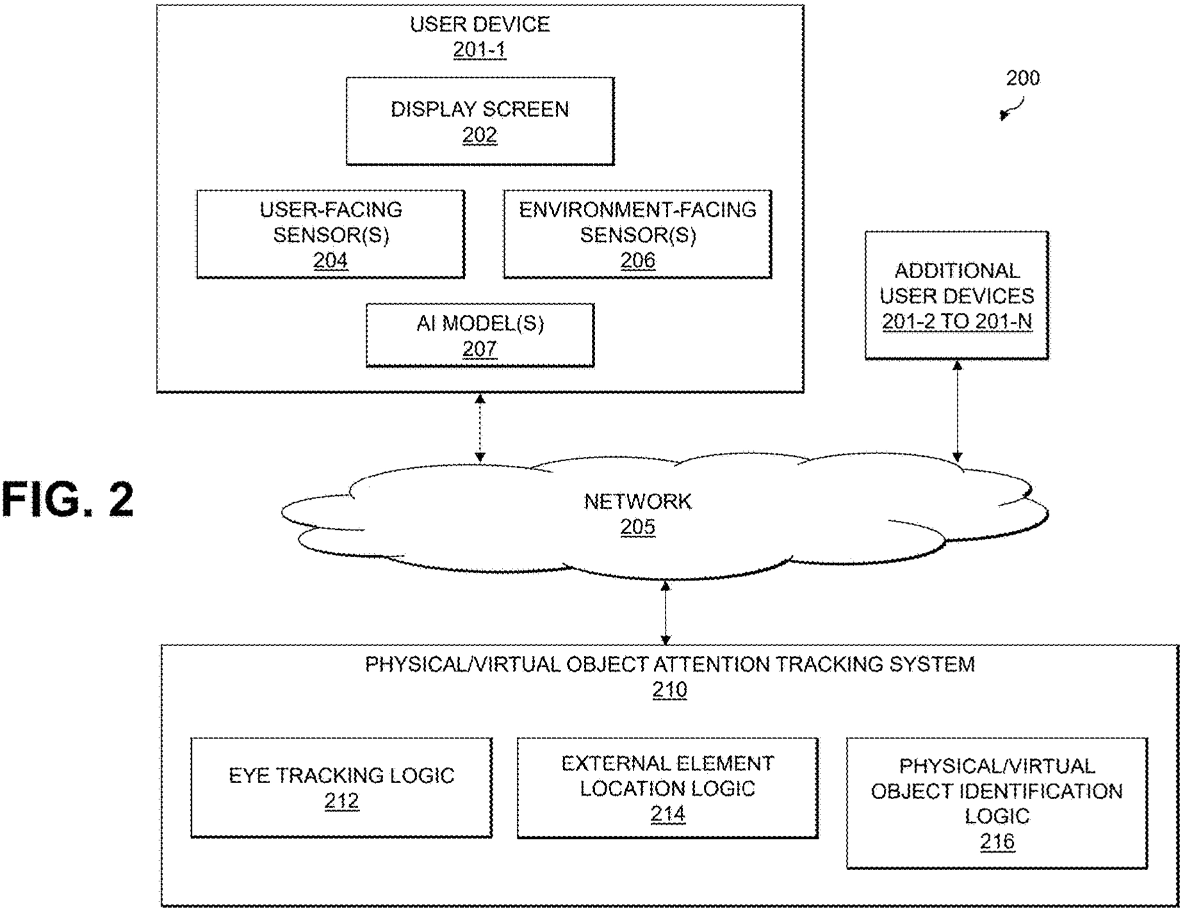
FIG. 2 is a block diagram of an example information processing system configured for physical and virtual object attention tracking in an illustrative embodiment.

Referring now to FIG. 2, another illustrative embodiment is shown. In this embodiment, an information processing system 200 is configured for physical and virtual object attention tracking, and includes a user device 201-1 and a plurality of additional user devices 201-2 through 201-N. Each of the user devices 201 is coupled to a network 205. Each of the additional user devices 201-2 through 201-N is assumed to be configured in a manner similar to that described below for user device 201.

The user device 201-1 comprises a display screen 202, one or more user-facing sensors 204, one or more environment-facing sensors 206, and one or more AI models 207. Unlike the user device 100 of the FIG. 1 embodiment, the user device 201-1 does not include a physical/virtual object attention tracking system, but instead that functionality in the present embodiment is implemented by a separate physical/virtual object attention tracking system 210 that is coupled to the network 205 as illustrated in the figure.

For example, in some embodiments, the physical/virtual object attention tracking system 210 is implemented on at least one cloud-based processing device configured to communicate with the user device 201-1 over the network 205.

Such a cloud-based processing device is illustratively part of what is more generally referred to herein as a processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 200 are possible, in which certain components of the system reside in one data center in a first geographic location while other components of the system reside in one or more other data centers in one or more other geographic locations that are potentially remote from the first geographic location. Thus, it is possible in some implementations of the information processing system 200 for different portions of the physical/virtual object attention tracking system 210 to reside in different data centers. Numerous other distributed implementations are possible.

Examples of such processing platforms will be described in more detail below in conjunction with FIGS. 13 and 14.

The physical/virtual object attention tracking system 210 illustratively comprises eye tracking logic 212, external element location logic 214 and physical/virtual object identification logic 216, which are assumed to operate in a manner similar to that described previously for the corresponding logic components 112, 114 and 116 of physical/virtual object attention tracking system 110 of user device 100.

In some embodiments, first sensor information obtained from at least one of the one or more user-facing sensors 204 and second sensor information obtained from at least one of the one or more environment-facing sensors 206 is captured in the user device 201-1 and sent over the network 205 to the physical/virtual object attention tracking system 210 for further processing as described herein. The physical/virtual object attention tracking system 210 illustratively performs similar processing for first and second sensor information received from each of the additional user devices 201-2 through 201-N. This processing may involve, for example, returning one or more control signals to each of the user devices 201 to trigger one or more automated actions in the corresponding user device based at least in part on their corresponding first and second sensor information. Such automated actions in some embodiments illustratively involve, for example, providing inputs to and/or processing outputs from the one or more AI models 207 deployed on the user device 201-1.

The network 205 is assumed to comprise a global computer network such as the Internet, although other types of networks can be part of the network 205, including a wide area network (WAN), a local area network (LAN), a satellite network, a telephone or cable network, a cellular network such as 4G or 5G network, a wireless network such as a WiFi or WiMAX network, or various portions or combinations of these and other types of networks. The system 200 in some embodiments therefore comprises combinations of multiple different types of networks. Such networks can support inter-device communications utilizing Internet Protocol (IP) and/or a wide variety of other communication protocols.

The system 200 comprising the user devices 201, the network 205 and the physical/virtual object attention tracking system 210 is an example of what is more generally referred to herein as an "information processing system." Other examples of information processing systems are described elsewhere herein, and the term is intended to be broadly construed to encompass, for example, various arrangements of one or more processing devices, with each such processing device comprising at least one processor and at least one memory coupled to the at least one processor.

In some embodiments, such an information processing system further comprises one or more storage systems associated with one or more processing platforms. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The user devices 201 in some embodiments comprise respective computers associated with a particular company, organization or other enterprise. Thus, the user devices 201 may be considered examples of assets of an enterprise system. In addition, at least portions of the information processing system 200 may also be collectively associated with one or more enterprises.

As indicated previously, the physical/virtual object attention tracking system 210 of the information processing system 200 may be implemented at least in part in cloud infrastructure. For example, the physical/virtual object attention tracking system 210 may be provided as a cloud service that is accessible by one or more of the user devices 201 to allow users thereof to obtain access to the associated functionality. In some embodiments, at least a portion of the user devices 201 are assumed to be associated with respective users of an enterprise, organization or other entity that seeks to provide such functionality to its users. Additionally or alternatively, in some embodiments, at least a portion of the user devices 201 are utilized by members of the same enterprise, organization or other entity that operates the physical/virtual object attention tracking system 210. In other embodiments, the user devices 201 are utilized by members of one or more enterprises, organizations or other entities different than the enterprise, organization or other entity that operates the physical/virtual object attention tracking system 210 (e.g., a first enterprise provides support functionality for multiple different customers, businesses, etc.). Numerous other arrangements are possible.

It is to be appreciated that the particular arrangement of the user devices 201, the network 205 and the physical/virtual object attention tracking system 210 illustrated in the FIG. 2 embodiment is presented by way of example only, and alternative arrangements can be used in other embodiments.

These and other features of illustrative embodiments are presented by way of example only, and should not be construed as limiting in any way.

An example process for physical and virtual object attention tracking will now be described in more detail with reference to the flow diagram of FIG. 3. It is to be understood that this particular process is only an example, and that additional or alternative processes for physical and virtual object attention tracking may be used in other embodiments.

In this embodiment, the process includes steps 300 through 306. These steps are assumed to be performed by the user device 100 of FIG. 1 or the system 200 of FIG. 2 utilizing the physical/virtual object attention tracking system 110 or 210 and its associated logic components, More particularly, these steps represent an example algorithm collectively implemented by the logic components 112, 114 and 116 of physical/virtual object attention tracking system 110 in user device 100 or the logic components 212, 214 and 216 of physical/virtual object attention tracking system 210 in system 200.

In step 300, first sensor information is obtained from at least one user-facing sensor of a user device. Such a user-facing sensor may comprise, for example, a camera having a field of view that includes at least a portion of the user. The first sensor information can comprise information such as images that are obtained directly from the user-facing sensor and/or other information that is generated based at least in part on these or other outputs of the user-facing sensor.

In step 302, second sensor information is obtained from at least one environment-facing sensor of the user device. Such an environment-facing sensor may comprise, for example, a camera having a field of view that includes at least a portion of an external environment of the user device, but does not include any significant portion of the user. For example, the environment-facing sensor may be oriented so as to be directed away from the user, in contrast to a user-facing sensor that is oriented so as to be directed towards the user. The second sensor information can comprise information such as images that are obtained directly from the environment-facing sensor and/or other information that is generated based at least in part on these or other outputs of the environment-facing sensor.

In step 304, the first sensor information and the second sensor information are processed to identify an object of user attention, with the object comprising one of a physical object in an environment outside of the user device and a virtual object presented on a display screen of the user device. For example, in some embodiments, such processing illustratively involves tracking a line of sight of the user based at least in part on the first sensor information, determining a location of the physical object in the environment outside of the user device based at least in part on the second sensor information, and determining whether the line of sight of the user intersects with the location of the physical object in the environment outside of the user device or a location of the virtual object presented on a display screen of the user device. Other types of processing of the first and second sensor information can be performed in other embodiments. As indicated previously, such processing can be performed on the user device itself, or on another processing device or processing device accessible to the user device over a network, such as a cloud-based processing device.

In step 306, performance of at least one automated action is initiated based at least in part on the identifying of the object of user attention. For example, the automated action may comprise automatically presenting information on the display screen of the user device relating to an identified object in the environment outside of the user device. In one arrangement of this type, a user can look at a physical book on a bookshelf in the environment outside of the user device, and an activatable icon to open an electronic version of the book can be presented on the display screen of the user device, so as to allow the user to access the content of the physical book via the electronic version thereof on the user device. As another example, the automated action may comprise establishing a network connection with an additional device corresponding to an identified object in the environment outside of the user device. In one arrangement of this type, a user can initiate a connection with a wireless peripheral that is external to the user device by looking in the direction of the wireless peripheral. Other examples of automated actions include providing inputs to and/or processing outputs from one or more AI models deployed on the user device or elsewhere in a corresponding information processing system. Numerous other types of automated actions can be performed based at least in part on an identified object of user attention as disclosed herein. Such automated actions may be initiated directly by the user device itself or initiated in the user device responsive to one or more control signals sent from an external processing device or platform to the user device over a network.

Figure 3:
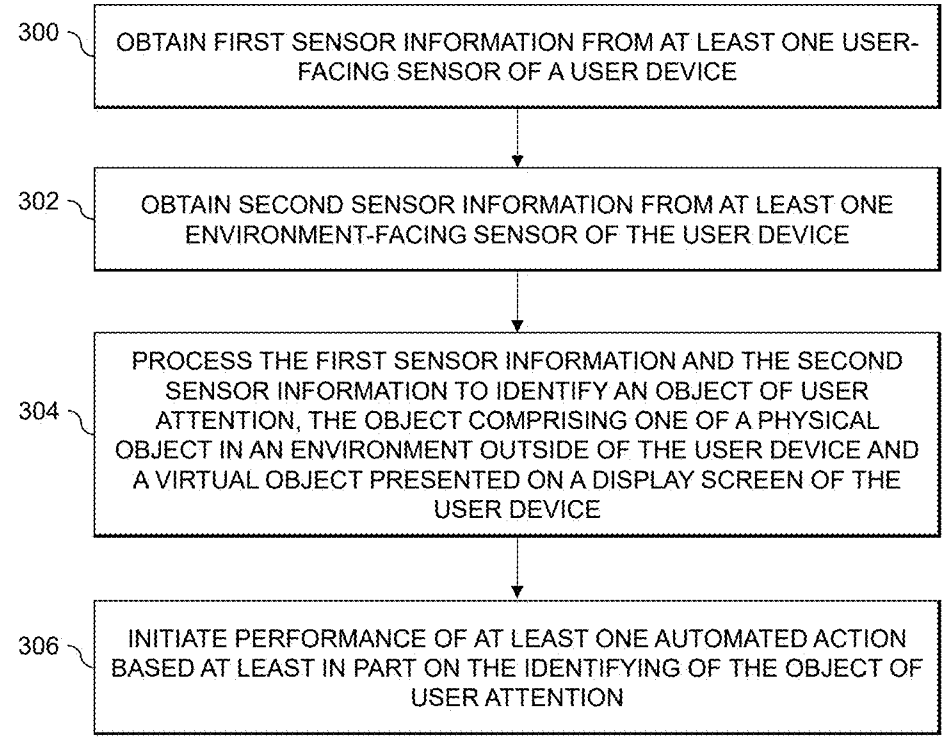
FIG. 3 is a flow diagram of an example process for physical and virtual object attention tracking in an illustrative embodiment.

The particular processing operations and other system functionality described in conjunction with the flow diagram of FIG. 3 are presented by way of illustrative example only, and should not be construed as limiting the scope of the disclosure in any way. Alternative embodiments can utilize other types and arrangements of processing operations. For example, the ordering of the process steps may be varied in other embodiments, or certain steps may be performed at least in part concurrently with one another rather than serially. Also, at least a portion of the process steps may be repeated in a substantially continuous manner in order to support ongoing tracking of physical and virtual object attention for a given user device. As another example, multiple instances of the process can be performed in parallel with one another, in order to perform tracking for different user devices and/or for different sets of sensors on the same user device.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional aspects of illustrative embodiments will be described below with reference to the examples of FIG. 4 through 12.

In some embodiments, user interaction with physical objects in an external environment is used to provide a user device with additional information as input for one or more generative AI models or other AI models, such as the one or more AI models 107 or 207 as previously described. For example, these and other embodiments can provide improved human-machine interaction based on the seamless capture of user intention through associated cues and the processing of such cues through one or more LLMs or other generative AI models in order to generate appropriate automated actions, such as controlling AI-based automated interactions with a user of the user device.

Accordingly, the disclosed techniques for physical and virtual object attention tracking can be implemented in AI-based personal computers and other AI-based user devices that are optimized for the efficient running of AI models and the seamless integration of AI to enhance the user experience and workflow with a computer or other user device.

This is advantageously achieved in illustrative embodiments by providing enhanced capabilities for identifying the object of attention of a user of a user device. For example, on a laptop, the object of attention can comprise a virtual object falling within the boundaries of a display screen of the laptop or a physical object in the surrounding environment of the laptop and its corresponding user.

Figure 4:
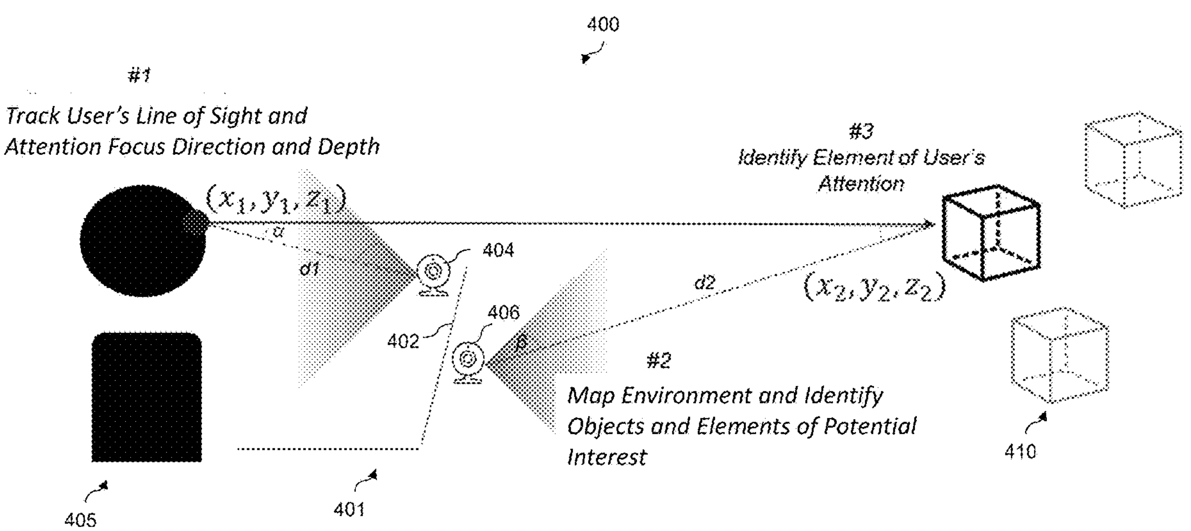
FIG. 4 shows an example of physical and virtual object attention tracking in an illustrative embodiment.

FIG. 4 shows an example of physical and virtual object attention tracking in an illustrative embodiment. In this embodiment, a system 400 comprises a laptop computer 401 that includes a display screen 402. At least one user-facing sensor 404 is arranged on a display screen side of a cover of the laptop computer 401, and includes a field of view that captures at least a portion of a user 405 that is viewing the display screen 402. Various virtual objects are assumed to be presented on the display screen 402 of the laptop computer 401. The system 400 further comprises at least one environment-facing sensor 406 arranged on an opposite side of the cover of the laptop computer 401 relative to the display screen side. The environment-facing sensor 406 has a field of view that encompasses multiple physical objects 410 in an environment external to the laptop computer 401, but generally does not encompass any significant part of the user 405. For example, in this embodiment, the environment-facing sensor 406 is directed away from the user 405, while the user-facing sensor 404 is directed towards the user 405. Numerous other sensor arrangements can be used in other embodiments.

The system 400 tracks the attention of the user 405 both within the boundaries of the display screen 402 of the laptop computer 401 and in an external environment outside of the laptop computer 401. This illustratively involves eye tracking based on outputs of the user-facing sensor 404 and locating physical objects 410 in the external environment based on outputs of the environment-facing sensor 406, in order to identify a particular physical or virtual object of attention of the user 405.

For example, in some embodiments, first sensor information from the user-facing sensor 404 and second sensor information from the environment-facing sensor 406 is processed in order to identify an object of user attention, illustratively by tracking a line of sight of the user 405 based at least in part on the first sensor information, determining locations of the physical objects 410 in the environment outside of the laptop computer 401 based at least in part on the second sensor information, and determining whether the line of sight of the user 405 intersects with the location of any of the physical objects 410 in the environment outside of the laptop computer 401 or a location of a virtual object presented on the display screen 402.

As a more particular example, illustrated by the enumerated processing steps shown in FIG. 4, an example algorithm may proceed as follows:

1. Track the user's line of sight, illustratively including focus direction and depth, in terms of a three-dimensional gaze vector denoted $(x_1, y_1, z_1)$, and further characterized by a user-sensor distance d1 and an angle $\alpha$ as shown, utilizing the user-facing sensor 404.
2. Map the external environment within a field of view of the environment-facing sensor 406 and identify objects and/or elements of potential interest, where an element may comprise at least a portion of one of the physical objects 410. For example, such a mapping for a particular element is illustratively characterized by a mapping vector denoted $(x_2, y_2, z_2)$, a sensor-element distance d2 and an angle $\beta$ as shown.
3. Identify a particular element and/or its associated physical object based at least in part on an intersection between the gaze vector and at least one mapping vector, as illustrated in the figure.

Such an algorithm can advantageously track the attention of the user 405 across virtual objects presented on the display screen 402 of the laptop computer 401 and physical objects 410 in the external environment. The particular processing steps are examples only, and at least some of the steps can be performed in an order other than that shown above. For example, certain steps can be performed at least in part in parallel with one another rather than serially. Also, additional or alternative processing steps can be used.

In these and other embodiments, the disclosed arrangements can capture additional user cues and associated information in order to facilitate multimodal interaction with generative AI models and other types of AI models deployed on a user device such as laptop computer 401 or elsewhere in system 400.

The algorithm illustrated in FIG. 4 illustratively implements a variant of triangulation in which the location of an unknown point can be determined from known locations of two other points and corresponding relative angles to the unknown point.

The user-facing sensor 404 and the environment-facing sensor 406 illustratively comprise respective cameras or other types of image sensors, although additional or alternative sensor types could be used. For example, infrared sensors, depth sensors, 3D sensors and/or other types of sensors may be used. The particular manner in which physical and virtual object attention tracking is implemented in a given embodiment can vary depending upon the types and arrangements of sensors used.

Also, although shown for simplicity of illustration as being adjacent to and separate from first and second sides of the cover of the laptop computer 401, the user-facing sensor 404 and the environment-facing sensor 406 can instead be fully integrated into their respective sides of the laptop computer. Also, the sensors 404 and 406 in some embodiments illustratively each refer to an arrangement of multiple sensors. The term "sensor" as used herein is intended to be broadly construed, so as to encompass, for example, a single sensor that incorporates multiple distinct sensor modalities, as well as a composite sensor that includes a sensor array or other arrangement of multiple sensors. Accordingly, the sensors 404 and 406 can each be viewed as comprising one or more distinct sensors.

Figure 5:
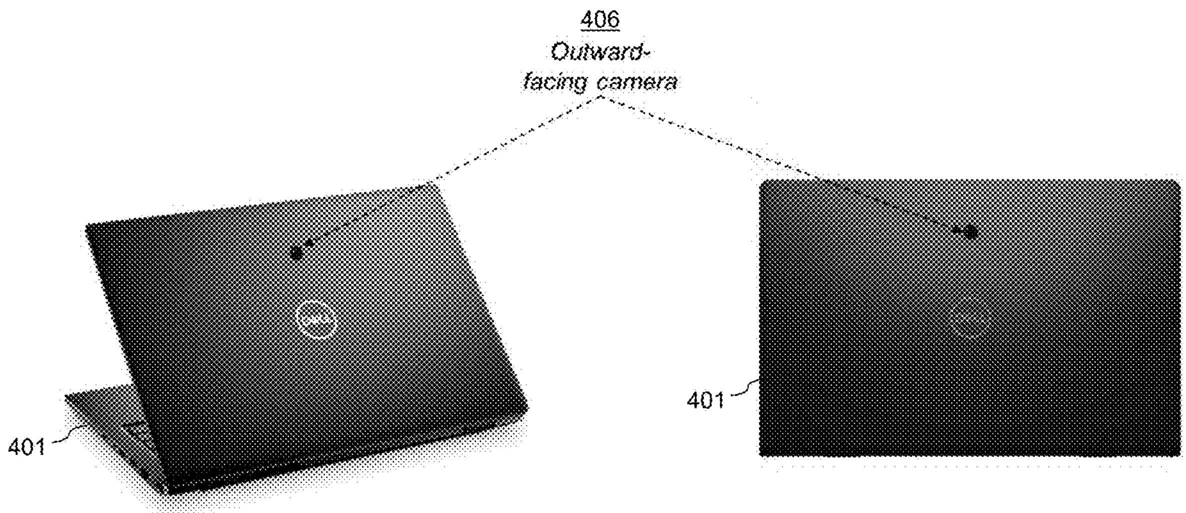
FIG. 5 shows an example of an environment-facing sensor arranged on a cover of a laptop in an illustrative embodiment.

FIG. 5 shows an example of the environment-facing sensor 406 being arranged on a cover of the laptop computer 401 as an outward-facing camera. The user-facing sensor 404 can be similarly integrated with the screen border or within the screen itself as an inward-facing camera on the display screen side of the laptop computer 401.

Subsequent description of illustrative embodiments in FIGS. 6 through 12 will be assumed to refer to laptop computer 401 and its user-facing sensor 404 and environment-facing sensor 406, although this is by way of illustrative example only. The disclosed techniques can be adapted in a straightforward manner for use with a wide variety of other types of user devices. Also, as indicated previously, these embodiments can include a single user-facing sensor 404 and a single environment-facing sensor 406, or can utilize multiple user-facing sensors and/or multiple environment-facing sensors, such as arrays of sensors, possibly of different sensor types, and the particular deployment arrangement for these sensors can be varied relative to the particular examples shown.

Figure 6:
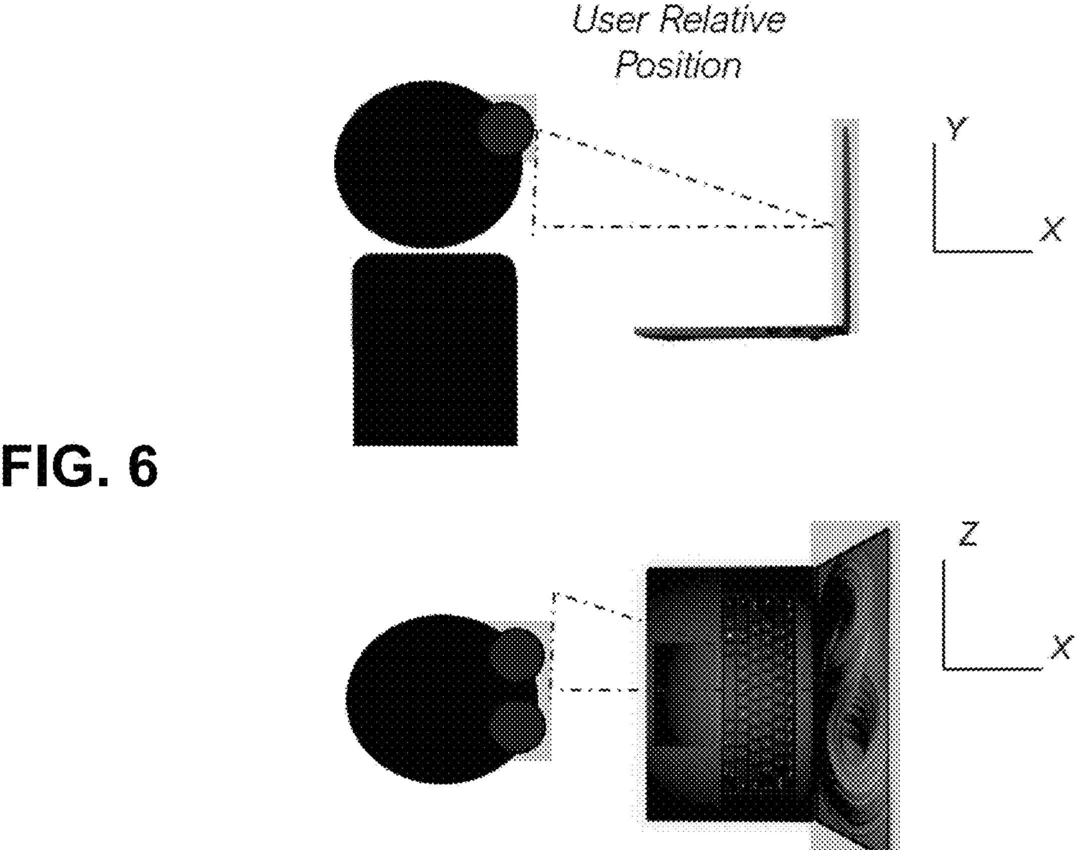
FIG. 6 shows an example of determining a position of a user relative to a laptop in an illustrative embodiment.

Referring now to FIG. 6, an example of determining a position of the user 405 relative to the laptop computer 401 is shown, in a side view at the upper portion of the figure and a top-down view in the lower portion of the figure. This determination illustratively involves determining the relative position of the user 405 with respect to the laptop computer 401 including a plane angle and dimensions of a surface of the display screen 402. The accuracy of the determination is a function of the type of user-facing sensor 404 that is used in a given embodiment. For example, some embodiments can implement user-facing sensor 404 as a single camera, as a combination of a camera and a gyroscope, or as a 3D camera including a depth sensor, with increasing complexity but also greater accuracy.

Figure 7:
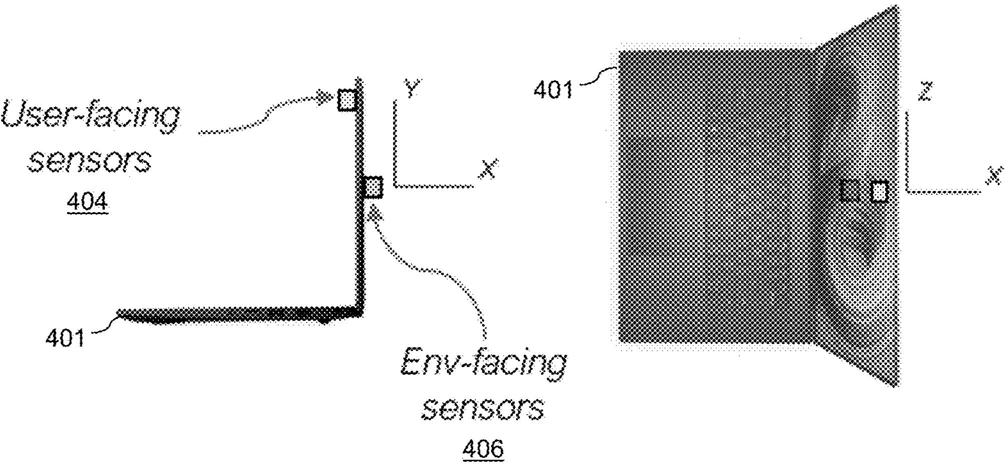
FIG. 7 shows an example of relative positions of user-facing and environment-facing sensors in an illustrative embodiment.

FIG. 7 shows an example of relative positions of user-facing sensor 404 and environment-facing sensor 406 in an illustrative embodiment, where each such respective sensor, as indicated previously, is more generally assumed to comprise one or more user-facing sensors or one or more environment-facing sensors, referred to as user-facing sensors and environment-facing ("Env-facing") sensors in the figure. Such sensor positioning is illustratively influenced by the particular structural configuration of the laptop computer 401. It is to be appreciated that other embodiments can utilize external sensors for one or both of the user-facing and environment-facing sensors. Such external sensors can communicate with the laptop computer 401 via wired or wireless connections.

Figure 8:
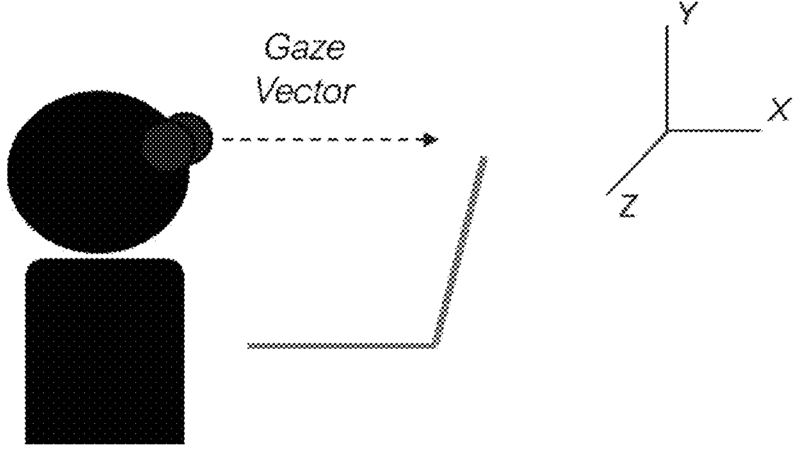
FIG. 8 shows an example of determining a gaze vector of a user in an illustrative embodiment.

FIG. 8 shows an example of determining a gaze vector of user 405 in an illustrative embodiment. The gaze vector generally indicates the particular direction in which the user is currently looking. In some embodiments, the gaze vector can be determined with a high level of accuracy using an eye tracking camera, such as a Tobii camera. It can also be determined with lesser levels of accuracy using standard cameras.

Figure 9:
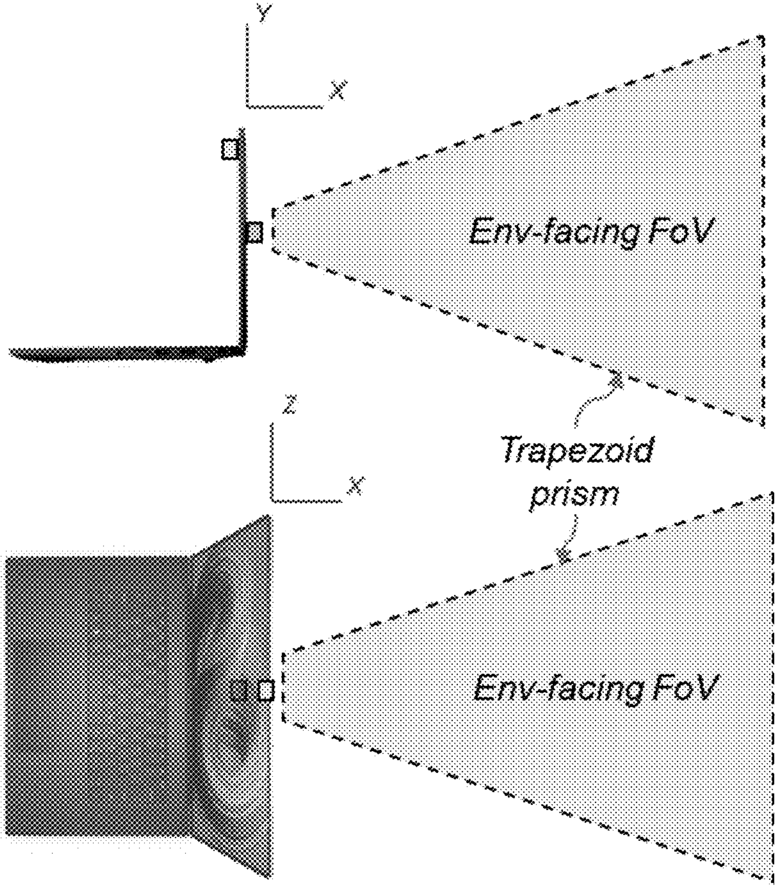
FIG. 9 shows an example of a field of view of an environment-facing sensor in an illustrative embodiment.

FIG. 9 shows an example of a field of view of environment-facing sensor 406 in an illustrative embodiment, in a side view at the upper portion of the figure and a top-down view in the lower portion of the figure. In this example, the field of view ("FoV") of the environment-facing sensor is a trapezoidal prism, and is generally dependent upon the specifications of the environment-facing sensor 406 in combination with the specific angle and position on outer cover of the laptop computer 401. Other field of view arrangements can be configured using one or more environment-facing sensors.

Figure 10:
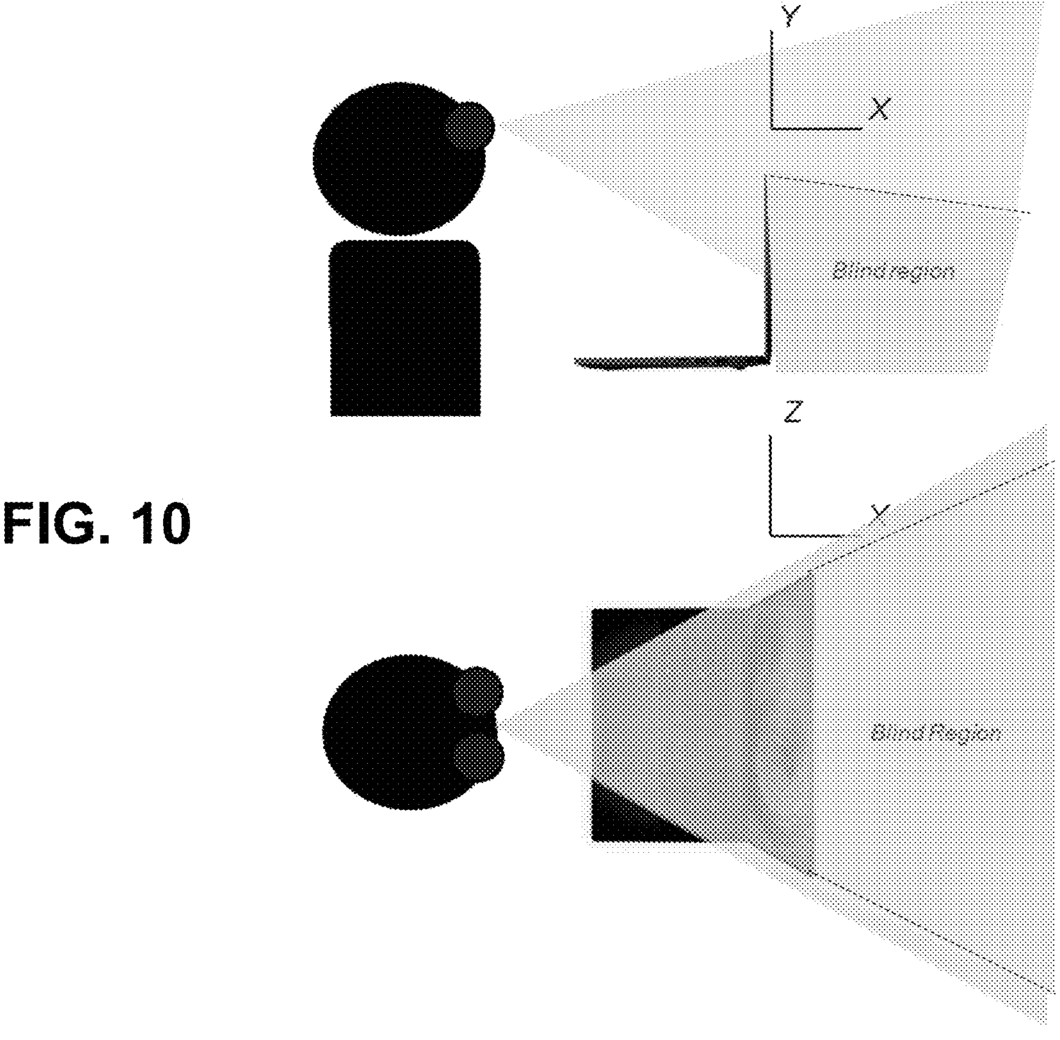
FIG. 10 shows an example of a blind region behind a laptop relative to a viewpoint of a user in an illustrative embodiment.

FIG. 10 shows an example of a blind region behind the laptop computer 401 relative to a viewpoint of the user 405 in an illustrative embodiment, in a side view at the upper portion of the figure and a top-down view in the lower portion of the figure. The blind region is generally a function of the position of the user 405 and the dimensions of the laptop computer 401, and accordingly will vary in different embodiments.

Figure 11:
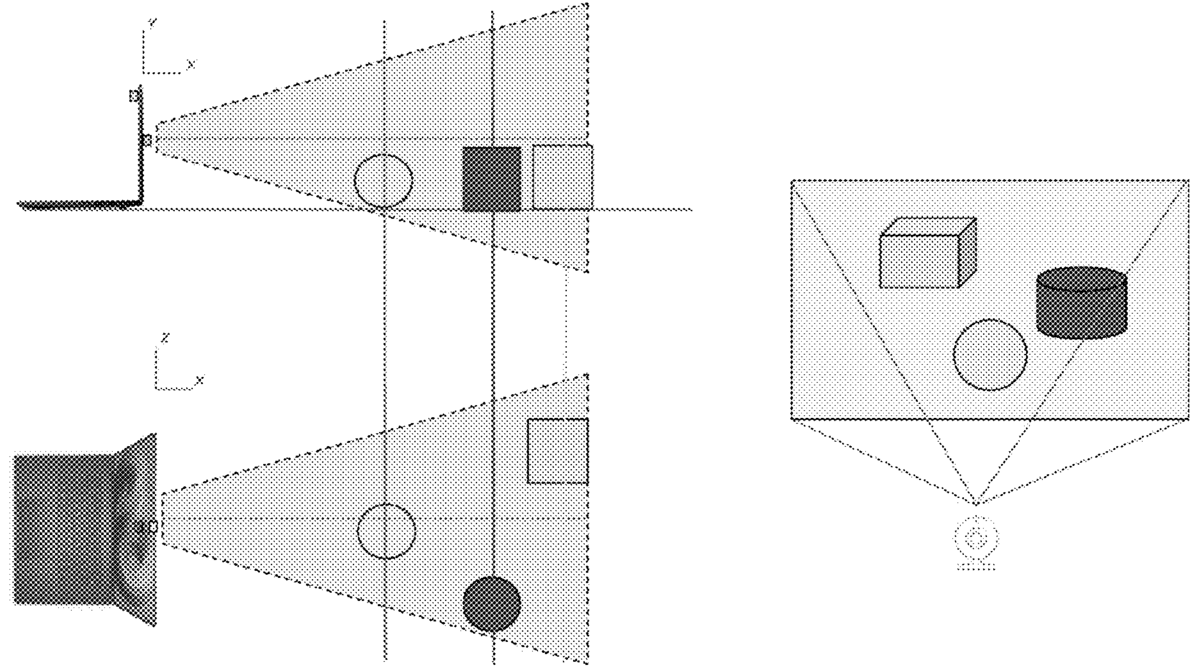
FIG. 11 shows an example of element depths as seen from an environment-facing sensor in an illustrative embodiment.

FIG. 11 shows an example of element depths as seen from environment-facing sensor 406 in an illustrative embodiment, in a side view at the upper portion of the left side of the figure, a top-down view in the lower portion of the left side of the figure, and a composite view at the right side of the figure. In some embodiments, object detection is implemented using a You Only Look Once (YOLO) algorithm, although other types of object detection algorithms can be used in other embodiments. Again, different levels of precision can be provided using different types of sensor arrangements. For example, a depth sensor can provide improved depth accuracy relative to a single standard camera.

A physical/virtual object attention tracking system of the type illustrated in FIG. 4 utilizes information such as the position of the user (e.g., the eyes of the user) with respect to the display screen 402 of the laptop computer 401, the gaze vector, and a list of positions of elements associated with particular physical objects (e.g., points, polyhedrons, etc.) as inputs to an intersection algorithm to identify a particular physical or virtual object of user attention in the system 400.

Depending on the type of sensors deployed in a given embodiment, and the associated accuracy of their various outputs, different levels of finer granularity can be supported, such as regions, pixels or other elements of a given object.

Figure 12:
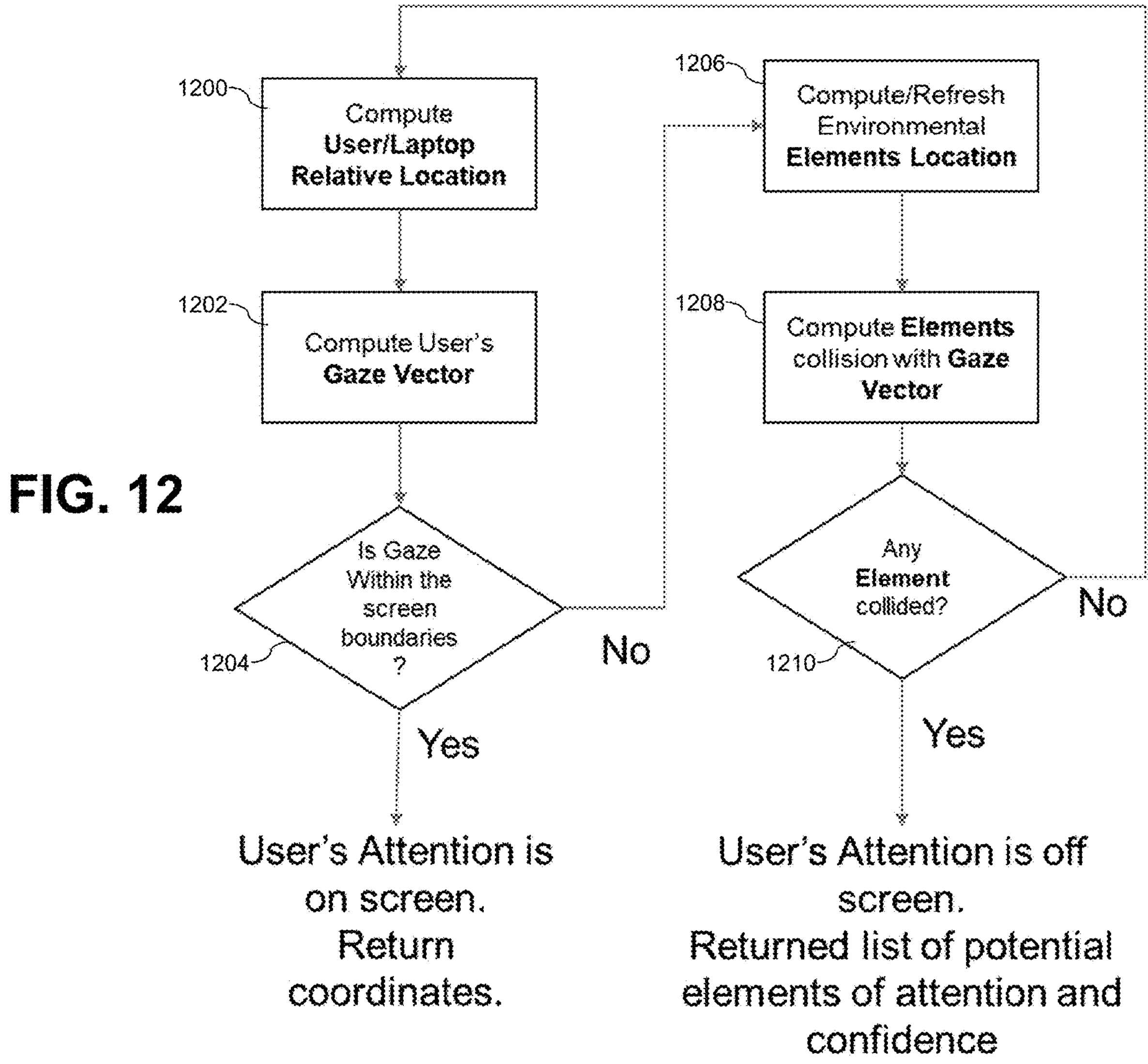
FIG. 12 is a flow diagram of another example process for physical and virtual object attention tracking in an illustrative embodiment.

Referring now to FIG. 12, another example process for physical and virtual object attention tracking in an illustrative embodiment. This process includes steps 1200 through 1210, and is assumed to be performed by the laptop computer 401, utilizing its user-facing sensor 404 and its environment-facing sensor 406, although it may be similarly performed using other types of user devices and other types and arrangements of multiple sensors in other embodiments.

In step 1200, the location of the user 405 relative to the laptop computer 401 is determined, as illustrated by the user relative position in the example of FIG. 6.

In step 1202, the gaze vector of the user is determined in the manner previously described, and as illustrated in the example of FIG. 8.

In step 1204, a determination is made as to whether or not the user gaze as indicated by the gaze vector falls within the boundaries of the display screen 402 of the laptop computer 401. Responsive to an affirmative determination, the process outputs an indication that the user attention is on the display screen 402, and further returns the coordinates of a particular on-screen virtual object of the user attention. Responsive to a negative determination, the process moves to step 1206 as indicated.

In step 1206, locations of elements in the external environment are computed and/or refreshed.

In step 1208, intersection ("collision") between the element locations and the gaze vector is determined.

In step 1210, a determination is made as to whether or not any of the element locations intersect ("collide") with the gaze vector. Responsive to an affirmative determination, the process outputs an indication that the user attention is off screen, that is, is not on the display screen 402, and further returns a list of potential elements of attention can corresponding confidence values thereof, as indicated. Responsive to a negative determination, the process returns to step 1200 as indicated for a next iteration of the process.

The process may be repeated on a substantially continuous basis through multiple iterations as the user interacts with one or more virtual objects on the display screen and one or more physical objects in the external environment.

It is to be appreciated that the FIG. 12 process, like other processes and algorithms disclosed herein, is presented by way of illustrative example only, and should not be construed as limiting the scope of the disclosure in any way. Alternative embodiments can utilize other types and arrangements of processing operations. For example, the ordering of the process steps may be varied in other embodiments, or certain steps may be performed at least in part concurrently with one another rather than serially.

Illustrative embodiments provide numerous additional advantages over conventional approaches.

For example, some embodiments can advantageously track the attention of a user across both virtual objects presented on a display screen of a user device and physical objects in an environment external to the user device.

Illustrative embodiments can track user interaction with physical objects in an external environment in order to provide a user device with additional information as input for one or more AI models.

Some embodiments provide improved human-machine interaction based on the seamless capture of user intention through associated cues and the processing of such cues through one or more LLMs or other generative AI models in order to generate appropriate automated actions, such as controlling AI-based automated interactions with a user of the user device.

Illustrative embodiments can be implemented in AI-based personal computers and other AI-based user devices that are optimized for the efficient running of AI models and the seamless integration of AI to enhance the user experience and workflow with a computer or other user device.

These and other embodiments advantageously provide enhanced capabilities for identifying the object of attention of a user of a user device. For example, on a laptop, the object of attention can comprise a virtual object falling within the boundaries of a display screen of the laptop or a physical object in the surrounding environment of the laptop and its corresponding user.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for physical and virtual object attention tracking will now be described in greater detail with reference to FIGS. 13 and 14. Although described in the context of system 200, these platforms may also be used to implement at least portions of other information processing systems in other embodiments. FIG. 13 shows an example processing platform comprising cloud infrastructure 1300. The cloud infrastructure 1300 comprises a combination of physical and virtual processing resources that may be utilized to implement at least a portion of the information processing system 200 in FIG. 2. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

Figure 13:
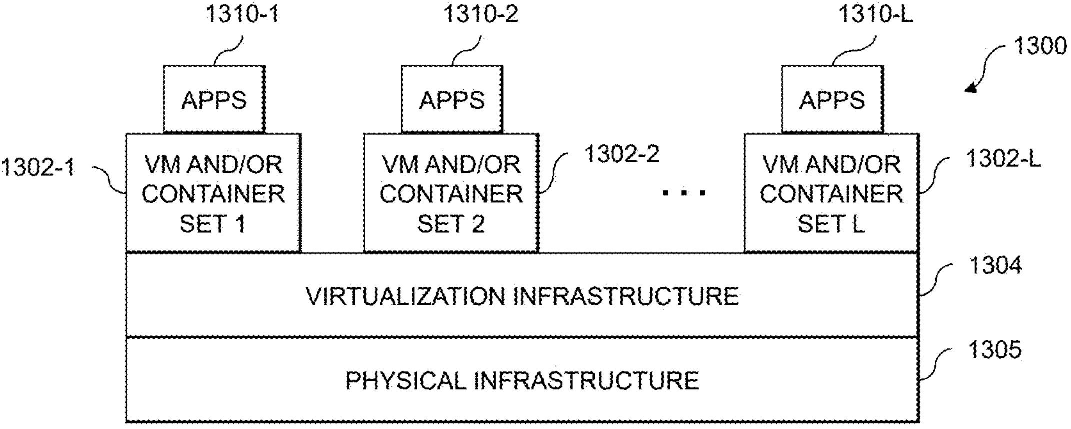
FIGS. 13 and 14 show examples of processing platforms that may be utilized to implement at least a portion of an information processing system in illustrative embodiments.
Figure 14:
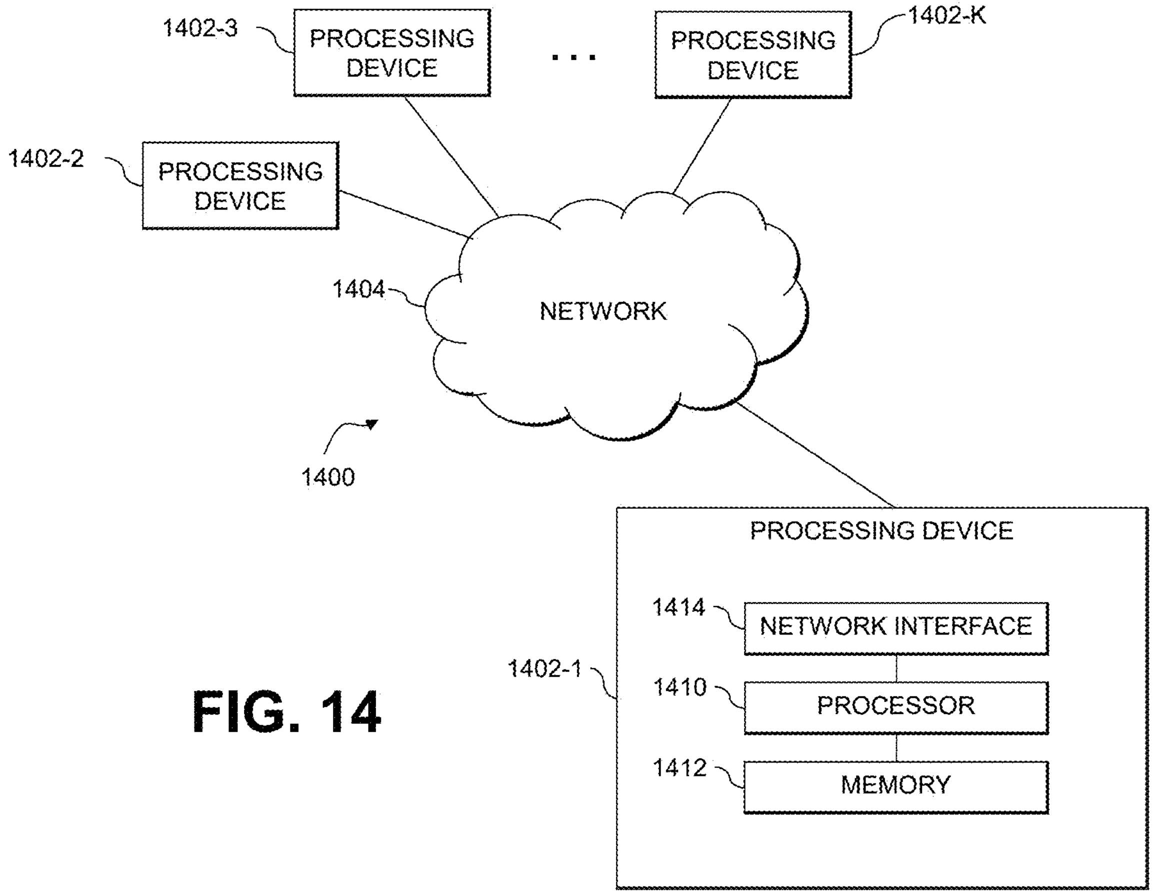

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 200 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 200 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphics processing unit (GPU), a neural processing unit (NPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for physical and virtual object attention tracking as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, user devices, user-facing and environment-facing sensors, logic components and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain first sensor information from at least one user-facing sensor of a user device;

to obtain second sensor information from at least one environment-facing sensor of the user device;

to process the first sensor information and the second sensor information to identify an object of user attention, the object comprising one of a physical object in an environment outside of the user device and a virtual object presented on a display screen of the user device; and to initiate performance of at least one automated action based at least in part on the identifying of the object of user attention.

2. The apparatus of claim 1 wherein the at least one processing device comprises the user device.

3. The apparatus of claim 1 wherein the at least one processing device comprises a cloud-based processing device configured to communicate with the user device over a network.

4. The apparatus of claim 1 wherein the user device comprises a laptop computer, with the user-facing sensor being arranged on a display screen side of a cover of the laptop computer and the environment-facing sensor being arranged on an opposite side of the cover relative to the display screen side.

5. The apparatus of claim 1 wherein one or more of the at least one user-facing sensor and the at least one environment-facing sensor comprise respective cameras.

6. The apparatus of claim 1 wherein processing the first sensor information and the second sensor information to identify an object of user attention comprises:

tracking a line of sight of the user based at least in part on the first sensor information;

determining a location of the physical object in the environment outside of the user device based at least in part on the second sensor information; and determining whether the line of sight of the user intersects with the location of the physical object in the environment outside of the user device or a location of the virtual object presented on a display screen of the user device.

7. The apparatus of claim 1 wherein processing the first sensor information and the second sensor information to identify an object of user attention comprises:

determining a gaze vector of the user based at least in part on the first sensor information; and determining whether or not a user gaze characterized by the gaze vector falls within designated boundaries of the display screen of the user device.

8. The apparatus of claim 7 further comprising determining a relative positioning of the user and the user device, and determining the gaze vector based at least in part on the relative positioning.

9. The apparatus of claim 7 wherein responsive to the user gaze characterized by the gaze vector being within designated boundaries of the display screen of the user device, determining coordinates of the user gaze and identifying the virtual object presented on a display screen of the user device based at least in part on the determined coordinates.

10. The apparatus of claim 7 wherein responsive to the user gaze characterized by the gaze vector not being within designated boundaries of the display screen of the user device, computing current locations of respective ones of a plurality of physical elements in the environment outside the user device, detecting intersection of the gaze vector with at least one of the physical elements, and identifying the physical object in the environment outside of the user device based at least in part on the detected intersection.

11. The apparatus of claim 10 wherein detecting intersection of the gaze vector with at least one of the physical elements comprises generating a list of potential elements and respective confidence measures for the potential elements, and wherein the physical object is identified based at least on part on one or more of the confidence measures.

12. The apparatus of claim 1 wherein the automated action comprises automatically presenting information on the display screen of the user device relating to an identified object in the environment outside of the user device.

13. The apparatus of claim 1 wherein the automated action comprises establishing a network connection with an additional device corresponding to an identified object in the environment outside of the user device.

14. A computer program product comprising a non-transitory processor-readable storage medium having stored therein program code of one or more software programs, wherein the program code when executed by at least one processing device causes the at least one processing device:

to obtain first sensor information from at least one user-facing sensor of a user device;

to obtain second sensor information from at least one environment-facing sensor of the user device;

to process the first sensor information and the second sensor information to identify an object of user attention, the object comprising one of a physical object in an environment outside of the user device and a virtual object presented on a display screen of the user device; and to initiate performance of at least one automated action based at least in part on the identifying of the object of user attention.

15. The computer program product of claim 14 wherein processing the first sensor information and the second sensor information to identify an object of user attention comprises:

tracking a line of sight of the user based at least in part on the first sensor information;

determining a location of the physical object in the environment outside of the user device based at least in part on the second sensor information; and determining whether the line of sight of the user intersects with the location of the physical object in the environment outside of the user device or a location of the virtual object presented on a display screen of the user device.

16. The computer program product of claim 14 wherein processing the first sensor information and the second sensor information to identify an object of user attention comprises:

determining a gaze vector of the user based at least in part on the first sensor information; and determining whether or not a user gaze characterized by the gaze vector falls within designated boundaries of the display screen of the user device.

17. A method comprising:

obtaining first sensor information from at least one user-facing sensor of a user device;

obtaining second sensor information from at least one environment-facing sensor of the user device;

processing the first sensor information and the second sensor information to identify an object of user attention, the object comprising one of a physical object in an environment outside of the user device and a virtual object presented on a display screen of the user device; and initiating performance of at least one automated action based at least in part on the identifying of the object of user attention;

wherein the method is performed by at least one processing device comprising a processor coupled to a memory.

18. The method of claim 17 wherein processing the first sensor information and the second sensor information to identify an object of user attention comprises:

tracking a line of sight of the user based at least in part on the first sensor information;

determining a location of the physical object in the environment outside of the user device based at least in part on the second sensor information; and determining whether the line of sight of the user intersects with the location of the physical object in the environment outside of the user device or a location of the virtual object presented on a display screen of the user device.

19. The method of claim 17 wherein processing the first sensor information and the second sensor information to identify an object of user attention comprises:

determining a gaze vector of the user based at least in part on the first sensor information; and determining whether or not a user gaze characterized by the gaze vector falls within designated boundaries of the display screen of the user device.

20. The method of claim 19 further comprising determining a relative positioning of the user and the user device, and determining the gaze vector based at least in part on the relative positioning.

* * * * *